(12) United States Patent
Matsui (10) Patent No.: US 6,876,813 B1
(45) Date of Patent: Apr. 5, 2005

(54) SIGNAL PROCESSING DEVICE FOR PROCESSING VIDEO SIGNAL INFORMATION BY USING MEMORY

(75) Inventor: Izumi Matsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/128,251

(22) Filed: Aug. 3, 1998

(30) Foreign Application Priority Data

Aug. 19, 1997 (JP) .............................. 9-222375

(51) Int. Cl.[7] .............................. H04N 7/26; H04N 5/85
(52) U.S. Cl. ...................................... 386/109; 386/124
(58) Field of Search ................................ 386/1, 38, 45, 386/117, 109, 111, 112, 27, 33, 124, 125, 10.7, 40; 358/906, 908.1, 909.1; 348/335, 334, 231–233; H04N 7/26, 5/85

(56) References Cited

U.S. PATENT DOCUMENTS

| | | | | |
|---|---|---|---|---|
| 4,992,782 A | * | 2/1991 | Sakamoto et al. | 345/555 |
| 5,065,246 A | * | 11/1991 | Takemoto et al. | 348/354 |
| 5,126,832 A | * | 6/1992 | Lee et al. | 348/589 |
| 5,510,840 A | * | 4/1996 | Yonemitsu et al. | 375/240.15 |
| 5,515,174 A | * | 5/1996 | Abe et al. | 386/118 |
| 5,585,858 A | * | 12/1996 | Harper et al. | 348/485 |
| 5,633,678 A | * | 5/1997 | Parulski et al. | 348/232 |
| 5,764,800 A | * | 6/1998 | Yamagata | 348/232 |
| 5,806,072 A | * | 9/1998 | Kuba et al. | 707/200 |
| 5,848,217 A | * | 12/1998 | Tsukagoshi et al. | 386/68 |
| 5,963,513 A | * | 10/1999 | Lemelson | 369/14 |
| 6,130,988 A | * | 10/2000 | Jeong | 386/125 |
| 6,181,878 B1 | * | 1/2001 | Honda | 348/116 |
| 6,201,571 B1 | * | 3/2001 | Ota | 348/239 |
| 6,359,707 B1 | * | 3/2002 | Tadokoro et al. | 358/500 |
| 6,483,540 B1 | * | 11/2002 | Akasawa et al. | 348/239 |

* cited by examiner

Primary Examiner—Robert Chevalier
(74) Attorney, Agent, or Firm—Cowan, Liebowitz & Latman, P.C.

(57) ABSTRACT

A signal processing device having a video signal input, a circuit for processing a video signal, a generating device for generating a character signal, and a memory for storing the video signal to be processed and for storing the character signal generated by the generating device. The processing circuit may include a high-efficiency encoding unit for compressing information of the video signal and encoding the video signal, or a high-efficiency decoding unit for decoding the video signal and expanding the decoded video signal, and the memory has a first area to be accessed by the encoding unit or by the decoding unit and a second area used by the generating device to generate the character signal.

33 Claims, 7 Drawing Sheets

| TABLE VALUE | ATTRIBUTE (4 bits) | Y VALUE (4 bits) | Cr VALUE (4 bits) | Cb VALUE (4 bits) |
|---|---|---|---|---|
| 0000 | attr0 | Y0 | Cr0 | Cb0 |
| 0001 | attr1 | Y1 | Cr1 | Cb1 |
| 0010 | attr2 | Y2 | Cr2 | Cb2 |
| 0011 | attr3 | Y3 | Cr3 | Cb3 |
| 1101 | attr13 | Y13 | Cr13 | Cb13 |
| 1110 | attr14 | Y14 | Cr14 | Cb14 |
| 1111 | attr15 | Y15 | Cr15 | Cb15 |

FIG. 7

SIGNAL PROCESSING DEVICE FOR PROCESSING VIDEO SIGNAL INFORMATION BY USING MEMORY

BACKGROUND OF THE INVENTION

1. Field of the Invention

The present invention relates to a signal processing device, more particularly to processing of character signals with respect to video signals.

2. Description of Related Art

Conventionally, in a camera-integrated VTR (video tape recorder), it has been common practice that a character signal indicating a character, a symbol or the like is superimposed on a video signal captured by a camera or on a reproduced video signal, so as to be displayed on an EVF (Electronic Viewfinder).

Figure 6:
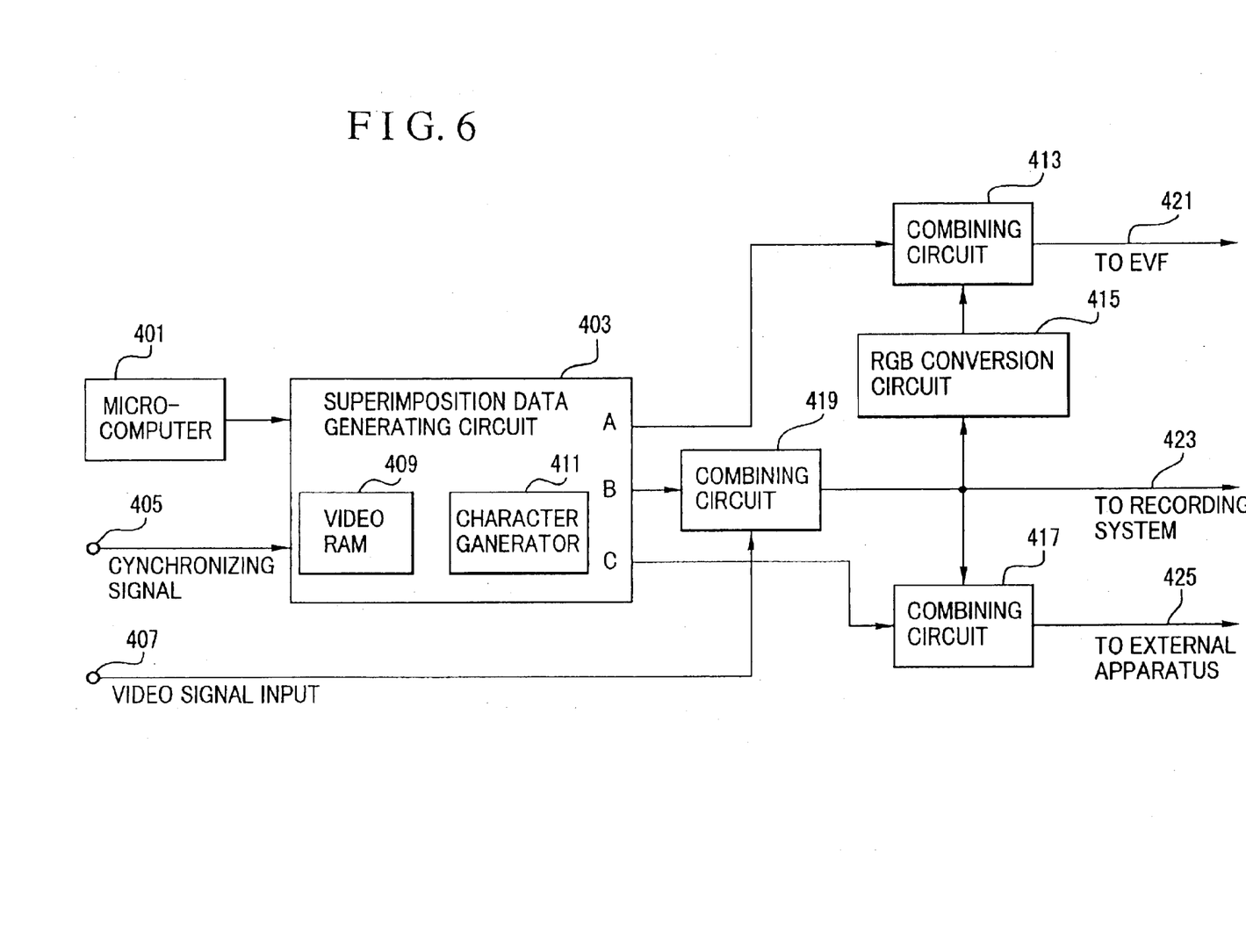
FIG. 6 shows the configuration of a conventional superimposition data generating circuit.

FIG. 6 is a block diagram showing the configuration of a circuitry for superimposing such a character signal on a video signal in the above kind of VTR.

In FIG. 6, a superimposition data generating circuit 403 includes a video RAM 409 and a character generator 411, and generates a character signal to be superimposed on a video signal by using the video RAM 409 and the character generator 411.

Figure 7:
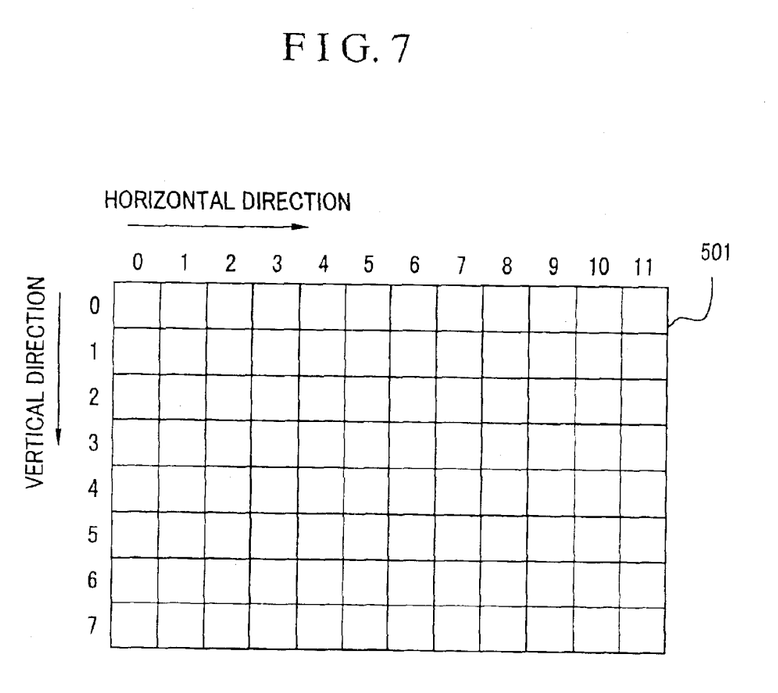
FIG. 7 shows the internal structure of a video RAM included in the circuit shown in FIG. 6.

Storage areas of the video RAM 409 respectively correspond to portions of a display image plane. For example, in a case where the display image plane is divided into twelve areas in the horizontal direction and eight areas in the vertical direction, the divided storage areas of the video RAM 409 become as shown in FIG. 7. A microcomputer 401 writes code data indicative of a character to be displayed, into each storage area 501 of the video RAM 409. The superimposition data generating circuit 403 reads out code data from the video RAM 409 in accordance with a synchronizing signal included in a video signal and inputted from a terminal 405 and outputs the code data to a character generator 411. The character generator 411 generates character signals according to each code data read out from the video RAM 409 and outputs the character signals to combining circuits 413, 419 and 417, from terminals A, B and C, respectively.

The combining circuit 419 combines the character signal outputted from the terminal B of the superimposition data generating circuit 403 with a video signal inputted from a terminal 407 and outputs the thus-obtained composite signal 423 to a processing circuit (not shown) in a recording system as a recording video signal 423. Additionally, the combining circuit 417 combines the output signal 423 of the combining circuit 419 and the character signal outputted from the terminal C of the superimposition data generating circuit 403 and outputs the thus-obtained composite signal 425 to an external apparatus.

An RGB conversion circuit 415 converts the output signal 423 of the combining circuit 419 into RGB signals and outputs the RGB signals to the combining circuit 413. The combining circuit 413 combines the character signal outputted from the terminal A of the superimposition data generating circuit 403 and the RGB signals outputted from the RGB conversion circuit 415 and outputs the thus-obtained composite signal 421 to an EVF (not shown).

As described above, in the conventional circuitry, the video RAM is separated into a plurality of areas corresponding to portions to a display image plane, and a code indicative of a character is written in an area on the video RAM that corresponds to a location in which the character is desired to be displayed.

Accordingly, when the number of characters desired to be displayed is intended to increase, the number of divisions of storage areas of the video RAM is increased to a great number, so that the number of locations in which characters are displayed can be increased.

However, if the video RAM is divided into a great number of areas as described above, an area for displaying one character has to be made small, so that the quality of a displayed character would lower.

On the other hand, if a display area for a character is enlarged to improve the quality of the displayed character, the number of divisions of storage areas 501 of the video RAM has to be decreased, so that locations for displaying characters would decrease.

In addition, as described above, since a character to be superimposed and a display location for the character are determined depending upon an output destination of the video signal, a storage area of the video RAM is also inevitably determined depending upon an output destination of the video signal.

In other words, for example, into an area into which a character code for the EVF is to be written, a character code for another kind of display cannot be written.

For this reason, when it is desired to change a location to display a character depending upon diversities of apparatus models, it is required to redesign the superimposition data generating circuit.

In addition, since the superimposition data generating circuit of such a type has been constructed by using a memory which is different from a memory used in a recording and reproduction circuit, the circuit scale is hindered from being made smaller.

BRIEF SUMMARY OF THE INVENTION

It is an object of the present invention to solve the problems described above.

It is another object of the present invention is to make it possible to generate a character signal without difficulties with the circuit scale not made larger.

To solve the problems described above and attain the above objects, in accordance with an aspect of the present invention, there is provided a signal processing device for processing a signal by using a memory, comprising compressing means for compressing an amount of information of a video signal by using the memory, and generating means for generating a character signal by using the memory.

These and further objects, features and advantages of the present invention will become apparent from the following detailed description of a preferred embodiment thereof taken in conjunction with the accompanying drawings.

DETAILED DESCRIPTION OF THE INVENTION

Hereinafter, a preferred embodiment of the present invention will be described in detail with reference to the drawings.

In the embodiment, the present invention is applied to a digital VTR.

Figure 1:
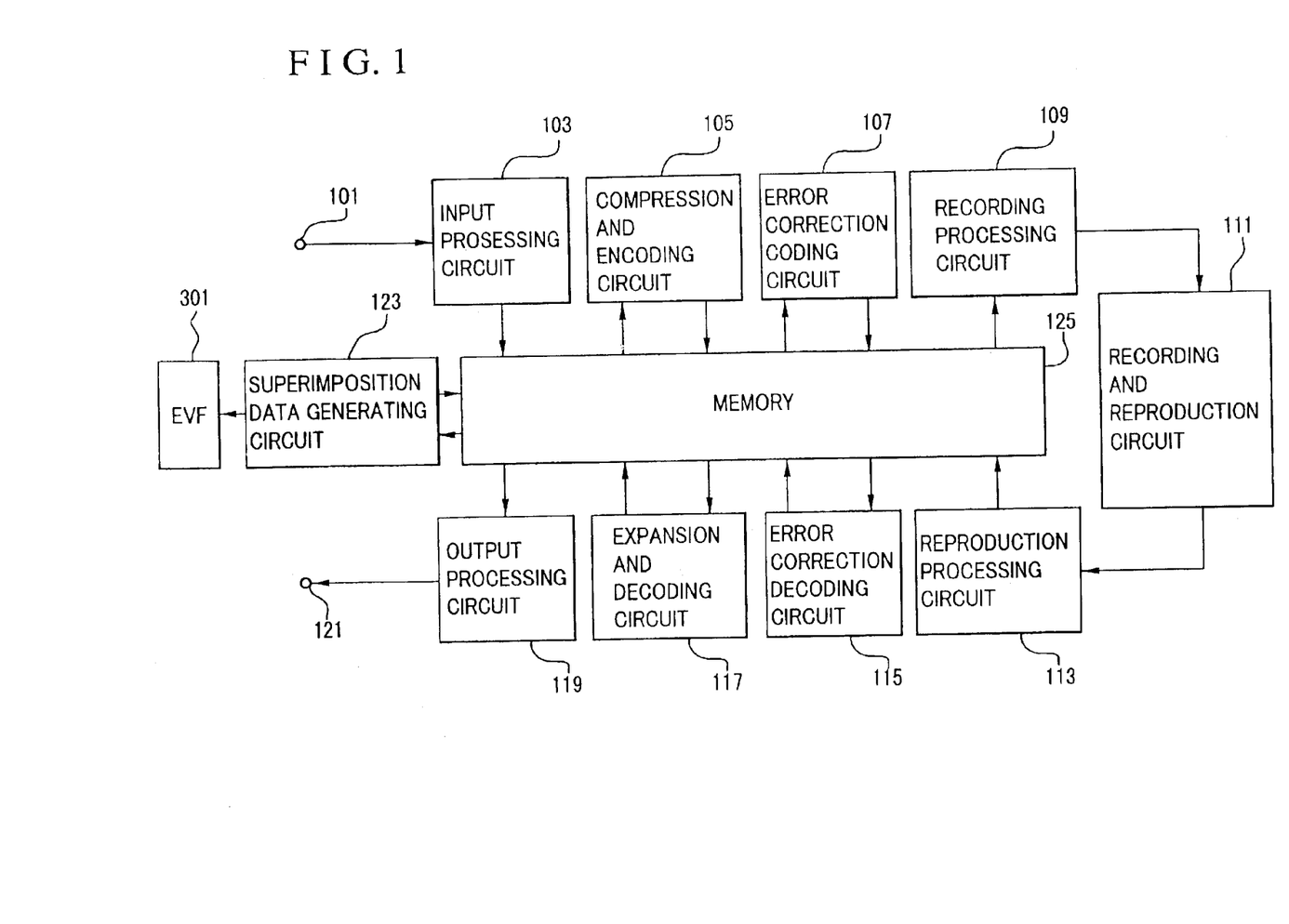
FIG. 1 is a block diagram showing the configuration of a digital VTR according to an embodiment of the present invention.

FIG. 1 is a block diagram showing the configuration of the digital VTR according to the embodiment of the present invention.

In FIG. 1, a video signal captured by a video camera or the like is inputted from a terminal 101, and is received by an input processing circuit 103. The input processing circuit 103 converts the inputted video signal into a digital video signal and writes the digital video signal into a memory 125 after gain adjustment and filtering. A compression and encoding circuit 105 reads out the video signal written to the memory 125, compresses the amount of information by using a well-known techniques such as DCT (discrete cosine transform) and variable-length encoding, encodes the compressed signal, and writes the encoded compressed signal into the memory 125.

An error correction coding circuit 107 accesses the memory 125 to add parity data to the video signal encoded by the compression and encoding circuit 105, for the purpose of error correction encoding of the video signal. A recording processing circuit 109 adds a synchronizing signal and ID data to the error-correction-encoded video signal, subjects the video signal to digital modulation so as to convert the video signal into a signal suitable for recording, and outputs the converted signal to a recording and reproduction circuit 111. The recording and reproduction circuit 111 forms tracks on a magnetic tape by using a rotational head and records on the tracks a signal outputted from the recording processing circuit 109.

Further, during reproduction, the recording and reproduction circuit 111 reproduces from the magnetic tape a signal recorded as described above and outputs the reproduced signal to a reproduction processing circuit 113. The reproduction processing circuit 113 demodulates the reproduced signal to recover an original digital signal. Further, the reproduction processing circuit 113 detects a synchronizing signal and ID data from among the reproduced signal and writes the reproduced signal into the memory 125 on the basis of the ID data. An error correction decoding circuit 115 accesses the memory 125 and subjects the reproduced video signal to error correction decoding processing to correct any errors included in the reproduced video signal.

An expansion and decoding circuit 117 accesses the memory 125 to subject the error-correction-processed video signal to the processing reverse to that performed during recording, decodes the reproduction video signal, expands the amount of information of the video signal and writes the thus-processed video signal into the memory 125. An output processing circuit 119 reads out the video signal decoded by the expansion and decoding circuit 117 from the memory 125, subjects the video signal to interpixel interpolation processing or the like, converts the video signal to an analog signal, and outputs the analog video signal to an external monitor or the like from a terminal 121.

Reference numeral 123 denotes a superimposition data generating circuit, which generates a superimposition data by using the memory 125 as will be described later. The superimposition data generating circuit 123, during recording, combines the superimposition data with a video signal inputted from the terminal 101 and written into the memory 125, and, during reproduction, combines the superimposition data with the video signal written into the memory 125 by the expansion and decoding circuit 117. Reference numeral 301 denotes an EVF composed of a liquid crystal display and so on. The EVF 301, during recording, displays an image represented by a video signal inputted from the terminal 101, and, during reproduction, displays an image represented by a video signal decoded.

Figure 2:
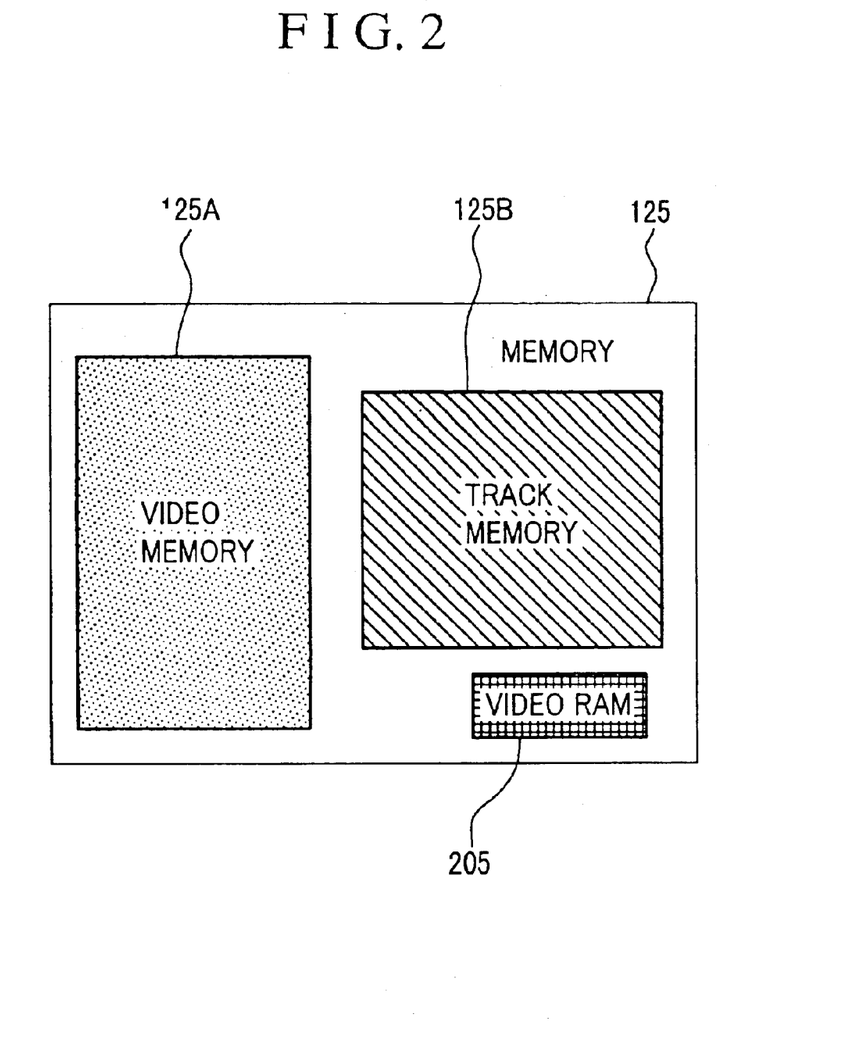
FIG. 2 shows the structure of a memory included in the digital;VTR shown in FIG. 1.

FIG. 2 shows the structure of storage areas of the memory 125. According to the embodiment, the memory 125 is provided with three storage areas having respective different addresses.

In FIG. 2, a storage area 125A, which is accessed by the input processing circuit 103, the compression and encoding circuit 105, the expansion and decoding circuit 117 and the output processing circuit 119, stores a video signal non-compressed and unencoded, and is called a "video memory" in the embodiment. A storage area 125B, which is accessed by the compression and encoding circuit 105, the error correction coding circuit 107, the recording processing circuit 109, reproduction processing circuit 113, the error correction decoding circuit 115 and the expansion decoding circuit 117, stores a video signal compressed and encoded and is called a "track memory" in the embodiment.

Further, a storage area 205 is an area to be used by the superimposition data generating circuit 123 (video RAM) as will be described later.

As shown in FIG. 2, in the VTR according to the embodiment, there is provided the memory 125 which is commonly accessed by each of the input/output processing circuits, the compression/expansion circuits, the error correction processing circuits, and recording/reproduction compression/expansion circuits, the error correction processing circuits, and recording/reproduction processing circuits, and addresses of the memory are differently allotted to the respective circuits depending on the usage thereof. The superimposition data generating circuit 123 generates superimposition data by using the area 205 other than areas which are accessed by the recording/reproduction-system circuits in the memory 125.

Next, the details of the superimposition data generating circuit 123 will be described.

Figure 3:
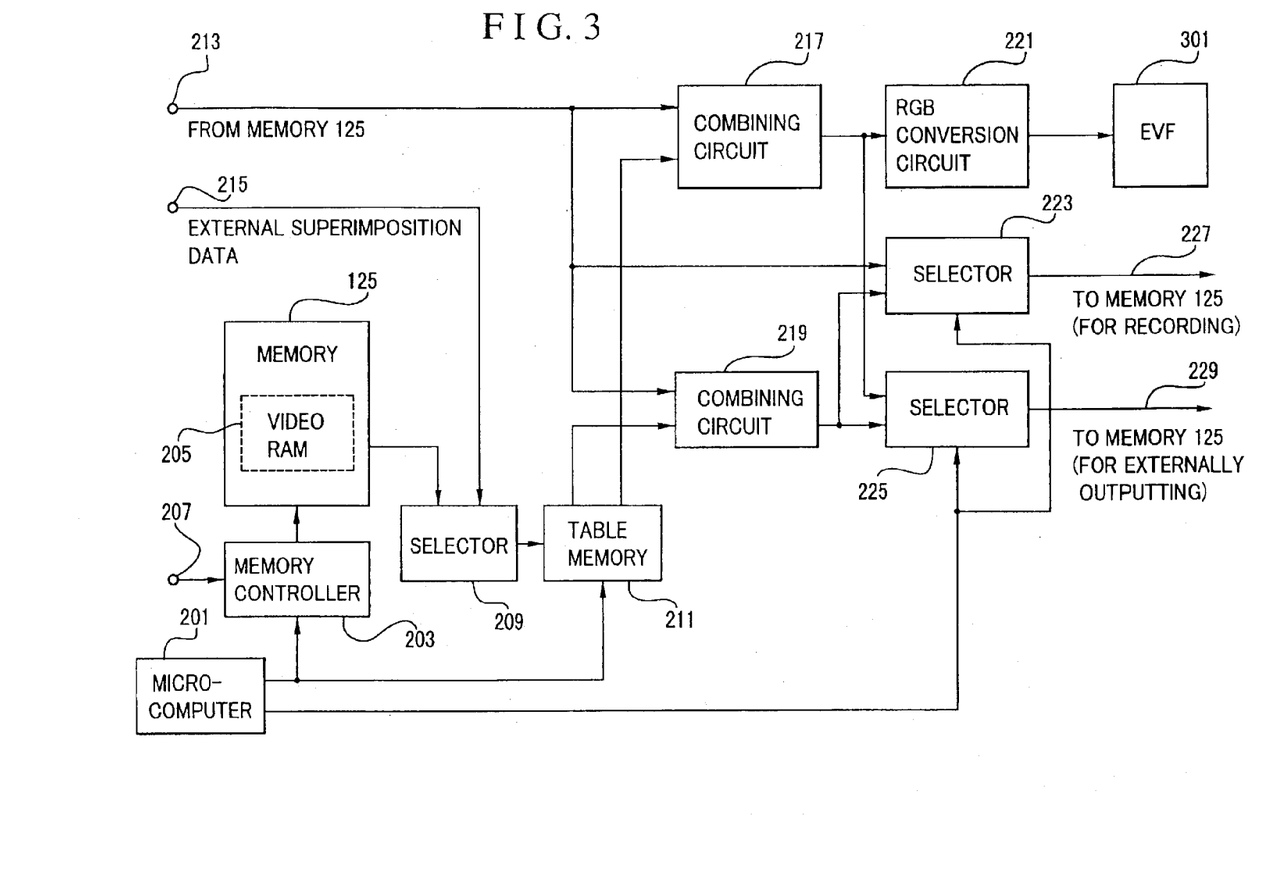
FIG. 3 is a block diagram showing the configuration of a superimposition data generating circuit included in the digital VTR shown in FIG. 1.
Figure 4:
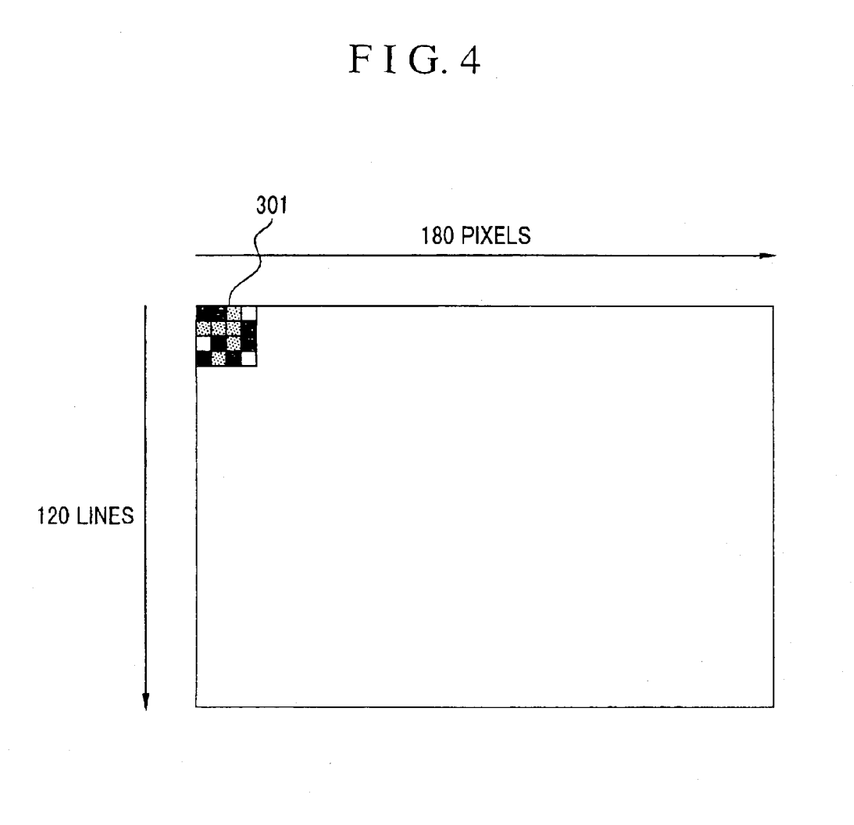
FIG. 4 shows the internal structure of a video RAM included in the digital VTR shown in FIG. 1.

FIG. 3 is a block diagram showing the configuration of the superimposition data generating circuit 123 and its peripheral circuit, and FIG. 4 shows the structure of the video RAM 205 in the embodiment.

In the embodiment, the video RAM 205 is divided into areas 301 which correspond to 180 pixels in the horizontal direction and 120 lines in the vertical direction. Referring to FIG. 3, by operating a microcomputer 201 to control a memory controller 203, a table value to be used in a table memory 211 is written into apposition on the video RAM 205 corresponding to a position at which the superimposition data is to be combined.

Figure 5:
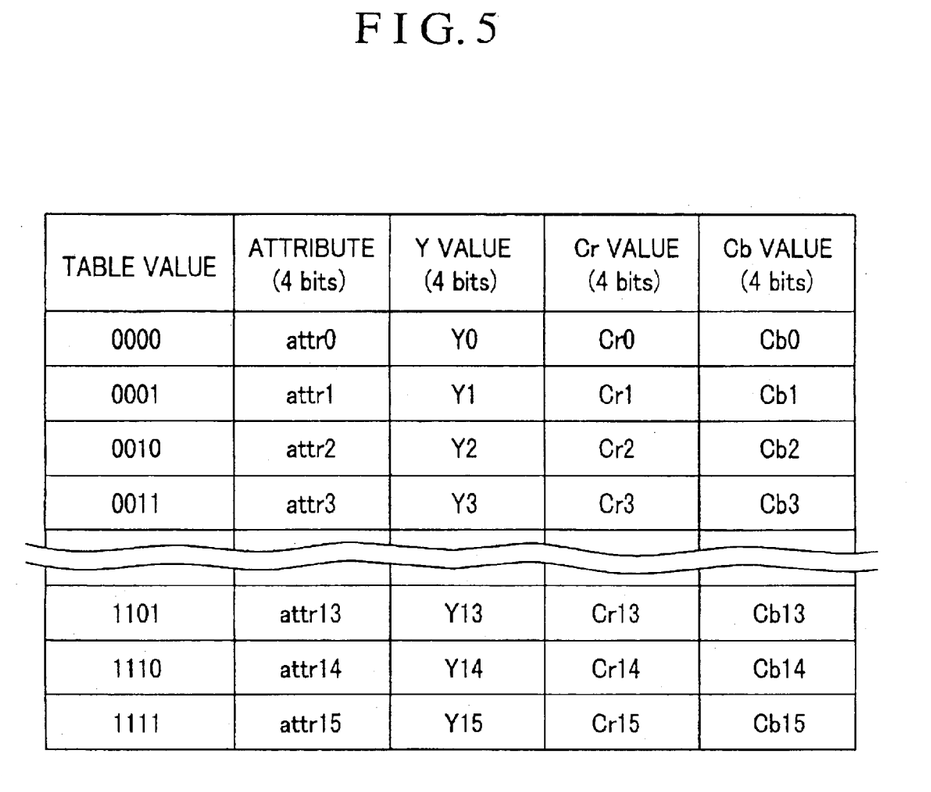
FIG. 5 is a table for explaining a table memory included in the circuit shown in FIG. 3.

Here, table values to be used in the table memory 211 in the embodiment and the contents of the table values will be described. FIG. 5 shows the contents of the table values to be used by the table memory 211.

According to the embodiment, 4-bit data is used as a table value. Each table value is assigned 16-bit data. The 16-bit data of each table value represents an attribute (4 bits) of superimposition data, values (each 4 bits) of Y, Cr and Cb, from the upper bit. The value of Y ranges from 0 to 15. The value of each of Cr and Cb ranges −8 to 7. Incidentally, the attribute represents data for controlling an actual combining operation such as replacement, averaging, interruption of combining for the video signal and the superimposition data. Additionally, the value of each of Y, Cr and Cb represents pixel data of color and luminance of a character signal of the superimposition data.

As described above, according to the embodiment, data representing pixel data itself which constitutes a character to be displayed is written into a corresponding position on the video RAM 205 as a table value. Accordingly, a character can be freely combined and displayed on the desired display location.

Further, the contents of each table value can be changed by the microcomputer 201 if necessary, and colors or a combining method of a character to be displayed can also be freely changed.

Referring to FIG. 3, the memory controller 203 causes each table value written into the video RAM 205 as described above to be outputted to the table memory 211 via a selector 209 in synchronism with a reference synchronizing signal inputted from a terminal 207. The table memory 211 generates, in accordance with the table value received, a character signal and an operation control signal for each of combining circuits 217 and 219.

A video signal read out from the memory 125 is inputted from the terminal 213. That is, during recording, there is read out and inputted a recording video signal inputted from the terminal 101 and written into the memory 125 by the input processing circuit 103, and, during reproduction, there is read out and inputted a reproduced video signal written into the memory 125 by the expansion and decoding circuit 117.

The combining circuit 217 combines the video signal inputted from the terminal 213 and the character signal for display outputted from the table memory 211, in accordance with the operation control signal outputted from the table memory 211, and outputs the thus-obtained composite signal to an RGB conversion circuit 221 and a selector 225.

Additionally, the combining circuit 219 combines the video signal inputted from the terminal 213 and the character signal for recording outputted from the table memory 211, in accordance with the operation control signal outputted from the table memory 211, and outputs the thus-obtained composite signal to selectors 223 and 225.

The RGB conversion circuit 221 converts the composite video signal outputted from the combining circuit 217 into RGB signals and outputs the RGB signals to the EVF 301.

The selector 223 is controlled by the microcomputer 201 to selectively output one of the video signal from the terminal 213 and the video signal from the combining circuit 219 and write the selected video signal into the memory 125 as a recording video signal 227.

Further, The selector 225 is controlled by the microcomputer 201 to selectively output one of the video signal from the combining circuit 217 and the video signal from the combining circuit 219 and write the selected video signal into the memory 125 as a video signal 229 for external output.

In addition, from a terminal 215, a table value supplied from an external circuit (not shown) is inputted in synchronism with the video signal inputted from the terminal 213. This external superimposition data can be generated by, for example, a conventional superimposition data generating circuit shown in FIG. 6.

The microcomputer 201 controls the memory controller 203, the table memory, 211, and the selectors 223 and 225 in accordance with instructions for recording or reproduction supplied from an operation part (not shown). Here, data to be superimposed on the recording video signal during recording is data representing a title indicative of contents of recording or a date and time of recording, and data to be outputted to the EVF 301 or data to be externally outputted is data representing conditions of a battery, an operation mode, a recording mode, a photographing state, etc.

As described above, according to the embodiment, a video RAM is constructed in a vacant space in a signal processing memory, and a table value indicating each pixel signal of superimposition data and a combining method thereof is written into a location in the video RAM which corresponds to a position at which the superimposition data is to be displayed. This arrangement enables a surplus space of the memory to be effectively utilized, and also enables a high-quality character to be freely combined and displayed at a desired location with a lesser memory capacity.

In addition, a memory capacity required for generating superimposition data can be adaptively determined according to a surplus space of a signal processing memory, the amount of information of the superimposition data, the quality of a character, etc.

Further, since each memory area on the video RAM 205 is hot determined depending upon an output destination of a character signal, only by adequately changing a table value to be written into the video RAM in accordance with the output destination, a common superimposition data generating circuit to be used, for example, for models having different character display locations can be realized.

Accordingly, differently from the circuit shown in FIG. 6, it is not required to redesign a circuitry whenever a character display location changes.

Further, in addition to pixel data for each character, attribute data for controlling a combining operation is added to a table value. This arrangement enables load imposed on a microcomputer to be reduced.

Although a table value is represented as 4-bit data in the embodiment described above, a larger number of bits can be accepted.

Furthermore, although in the embodiment described above, a case in which the present invention is applied to a digital VTR has been explained, the present invention to can be applied, without difficulties, to a device configured in an IC chip having an encoder and a decoder each meeting the MPEG standards incorporated, so that a more significant effect is achievable in this case.

What is claimed is:

1. A signal processing device, comprising:
   inputting means for inputting a video signal;
   encoding means for encoding to compress an amount of information of the video signal;
   generating means for generating a character signal;
   control means for controlling a combination operation of the character signal; and
   memory means connected to each of said encoding means and said generating means and having a common memory for storing the video signal to perform an encoding process by said encoding means and storing the character signal using a predetermined table value corresponding to a control signal by said control means to perform the combining operation of the character signal.

2. A device according to claim 1, further comprising:
combining means for combining the character signal generated by said generating means with the video signal.

3. A device according to claim 2, wherein said encoding means encodes to compress an amount of information of the video signal outputted from said combining means.

4. A device according to claim 3, further comprising:
outputting means for outputting the video signal the amount of information of which has been encoded by said encoding means to a recording device, said recording device recording the video signal outputted from said outputting means on the recording medium.

5. A device according to claim 2, further comprising:
outputting means for outputting a video signal outputted from said combining means to a display device, said display device displaying an image represented by the video signal outputted from said outputting means.

6. A device according the claim 2, wherein said combining means combines the character signal with a video signal captured by the image pickup means.

7. A device according to claim 1, wherein said memory means has a first area for storing a video signal an amount of which is to be encoded by said encoding means, a second area for storing a video signal an amount of which has been encoded by said encoding means, and a third area which is different from said first area and said second area, said generating means generating the character signal by using the third area.

8. A device according to claim 7, further comprising:
outputting means for reading out from said second area the video signal the amount of which has been encoded and outputting the read-out video signal to a recording device, said recording device recording the video signal outputted from said outputting means on a recording medium.

9. A device according to claim 1, wherein said memory means has a first area which is to be accessed by said encoding means, and a second area which corresponds to an image plane represented by the video signal and which is different from the first area, and wherein said generating means comprises memory control means for writing into said second area a plurality of codes representing a value of pixel data of the character signal, and a table for outputting pixel data corresponding to codes read out from said second area.

10. A device according to claim 9, further comprising:
combining means for combining the character signal generated by said generating means with the video signal,
the codes representing control data for controlling a combining operation of said combining means, said combining means performing the combining operation in accordance with the codes.

11. A device according to claim 1, wherein said encoding means comprises orthogonal transform means for orthogonally transforming the video signal, quantization means for quantizing orthogonal transform coefficients from said orthogonal transform means, and variable-length coding means for variable-length-coding an output of said quantization means.

12. A signal processing device, comprising:
inputting means for inputting a compressed video signal;
expanding means for expanding an amount of information of the compressed video signal and outputting an expanded video signal;
generating means for generating a character signal;
control means for controlling the combination operation of the character signal; and
memory means connected to each of said expanding means and said generating means and having a common memory for storing the compressed video signal to perform an expanding process by said expanding means and storing the character signal using a predetermined table value corresponding to a control signal by said control means to perform the combining operation of the character signal.

13. A device according to claim 12, further comprising:
combining means for combining the character signal generated by said generating means with the video signal.

14. A device according to claim 13, further comprising:
outputting mans for outputting a video signal outputted from said combining means to a display device, said display device displaying an image represented by the expanded video signal outputted by said expanding means.

15. A device according to claim 12, wherein said inputting means for inputting the compressed video signal reproduced from a recording medium by a reproduction device and writing the reproduced video signal into said memory means, said expanding means expanding an amount of information of the compressed video signal written into said memory means by said inputting means.

16. A device according to claim 12, wherein said memory means has a first area for storing a compressed video signal an amount of which is to be expanded by said expanding means, a second area for storing a expanded video signal an amount of which has been expanded by said expanding means, and a third area which is different from said first area and said second area, said generating means generating the third character signal by using said third area.

17. A device according to claim 12, wherein said memory means has a first area which is to be accessed by said expanding means, and a second area which corresponds to an image plane represented by the expanded video signal and which is different from said first area, and wherein said generating means comprises memory control means for writing into said second area a plurality of codes representing a value of pixel data of the character signal, and a table for outputting pixel data corresponding to codes read out from said second area.

18. A device according to claim 17, further comprising:
combining means for combining the character signal generated by said generating means with the expanded video signal the amount of which has been expanded by said expanding means,
the codes indicating a combining operation of said combining means, said combining means performing the combining operation in accordance with the codes.

19. A signal processing device, comprising:
inputting means for inputting a video signal;
processing means for performing a predetermined process on the video signal and outputting a processed video signal;

generating means for generating a character signal;

control means for controlling a combination operation of the character signal; and memory means connected to each of said processing means and said generating means and having a common memory for storing the video signal and the processed video signal so as to perform the predetermined process by said processing means and storing the character signal using a predetermined table value corresponding to a control signal by said control means to perform the combining operation of the character signal.

20. A device according to claim 19, wherein said processing means includes a high-efficiency encoding means for compressing an amount of information of the video signal and for encoding the video signal.

21. A device according to claim 20, wherein said memory means has a first area which is to be accessed by said high-efficiency encoding means, and a second area other than said first area, said generating means generating the character signal by using the second area.

22. A device according to claim 20, wherein said processing means further comprising error correction encoding means for error-correction-encoding the encoded video signal.

23. A device according to claim 22, wherein said memory means has a first area which is to be accessed by said high-efficiency encoding means, a second area which is to be accessed by said error correction encoding means, and a third area other than said first area and said second area, said generating means generating the character signal using said third area.

24. A device according to claim 19, wherein said processing means includes a high-efficiency decoding means for decoding the video signal and for expanding an amount of the decoded video signal.

25. A device according to claim 24, wherein said memory means has a first area which is to be accessed by said high-efficiency decoding means, and a second area other than said first area, said generating means generating the character signal by using said second area.

26. A device according to claim 24, wherein said processing means further includes error-correction-decoding means for correcting any error in the video signal.

27. A device according to claim 26, wherein said memory means includes a first area which is to be accessed by said high-efficiency decoding means, a second area which is to be accessed by said error correction decoding means, and a third and other than said first area and said second area, said generating means generating the character signal by using said third area.

28. A recording apparatus, comprising:

inputting means for inputting a video signal;

compressing means for compressing an amount of information of the video signal and outputting a compressed video signal;

recording means for recording on a recording medium the compressed video signal;

generating means for generating a character signal;

control means for controlling a combination operation of the character signal; and memory means connected to each of said compressing means, said recording means and said generating means, and having a common memory for storing the video signal to perform a compressing process by said compressing means, the compressed video signal outputted from said compressing means to record on the recording medium by said recording means and the character signal using a predetermined table value corresponding to a control signal by said control means to perform a the combining operation of the character signal.

29. An apparatus according to claim 28, further comprising;

combining means for combining the character signal with the video signal.

30. An apparatus according to claim 29, wherein said compressing means compresses an amount of information of a combined video signal outputted from said combining means, said recording means recording the combined video signal outputted from said compressing means.

31. An apparatus according to claim 29, further comprising:

display means for displaying an image represented by the combined video signal outputted from said combining means.

32. An apparatus according the claim 28, further comprising:

reproducing means for reproducing from the recording medium the compressed video signal compressed by said compressing means, and for writing the reproduced video signal into said memory means.

33. An apparatus according to claim 32, further comprising:

expanding means for expanding an amount of information of the reproduced video signal by using said memory means; and combining means for combining the character signal with the video signal the amount of which has been expanded by said expanding means.

* * * * *